United States Patent
Chon et al.

(10) Patent No.: US 12,001,850 B2
(45) Date of Patent: Jun. 4, 2024

(54) METHOD FOR DETERMINING FUNCTIONAL SAFETY OF RESET, AND ELECTRONIC DEVICE FOR EXECUTING SAME

(71) Applicant: NEXTCHIP CO., LTD., Seongnam-si (KR)

(72) Inventors: E Woo Chon, Seoul (KR); Su Hyun Jo, Suwon-si (KR)

(73) Assignee: NEXTCHIP CO., LTD., Seongnam-si (KR)

( * ) Notice: Subject to any disclaimer, the term of this patent is extended or adjusted under 35 U.S.C. 154(b) by 0 days.

(21) Appl. No.: 17/767,585

(22) PCT Filed: Jul. 20, 2020

(86) PCT No.: PCT/KR2020/009507
§ 371 (c)(1),
(2) Date: Apr. 8, 2022

(87) PCT Pub. No.: WO2021/101013
PCT Pub. Date: May 27, 2021

(65) Prior Publication Data
US 2024/0103880 A1    Mar. 28, 2024

(30) Foreign Application Priority Data
Nov. 21, 2019   (KR) .................. 10-2019-0150127

(51) Int. Cl.
*G06F 9/44* (2018.01)
*G06F 9/4401* (2018.01)

(52) U.S. Cl.
CPC .................. *G06F 9/4401* (2013.01)

(58) Field of Classification Search
CPC ...................................... G06F 9/4401
See application file for complete search history.

(56) References Cited

FOREIGN PATENT DOCUMENTS

| KR | 2002-0017017 A | 3/2002 |
| KR | 2003-0072833 A | 9/2003 |
| KR | 2009-0114021 A | 11/2009 |
| KR | 2014-0056537 A | 5/2014 |
| KR | 2016-0041358 A | 4/2016 |

OTHER PUBLICATIONS

PCT International Search Report (with English Translation) dated Oct. 15, 2020 for International Application No. PCT/KR2020/009507; 5 Pages.

*Primary Examiner* — Zahid Choudhury
(74) *Attorney, Agent, or Firm* — DALY, CROWLEY, MOFFORD & DURKEE, LLP

(57) ABSTRACT

In order to determine whether a reset function of an electronic device is safe, the states of a first checker and a second checker are toggled to preset states when a reset root is received from an external device. When a release of a local reset is received, whether the local reset was normally released is determined on the basis of a system clock. When the local reset is not normally released, the state of the second checker is toggled, and when the final local reset among the local resets is normally released, the state of the first checker is toggled. The release states of the local resets are monitored on the basis of the state of the first checker and the state of the second checker.

15 Claims, 7 Drawing Sheets

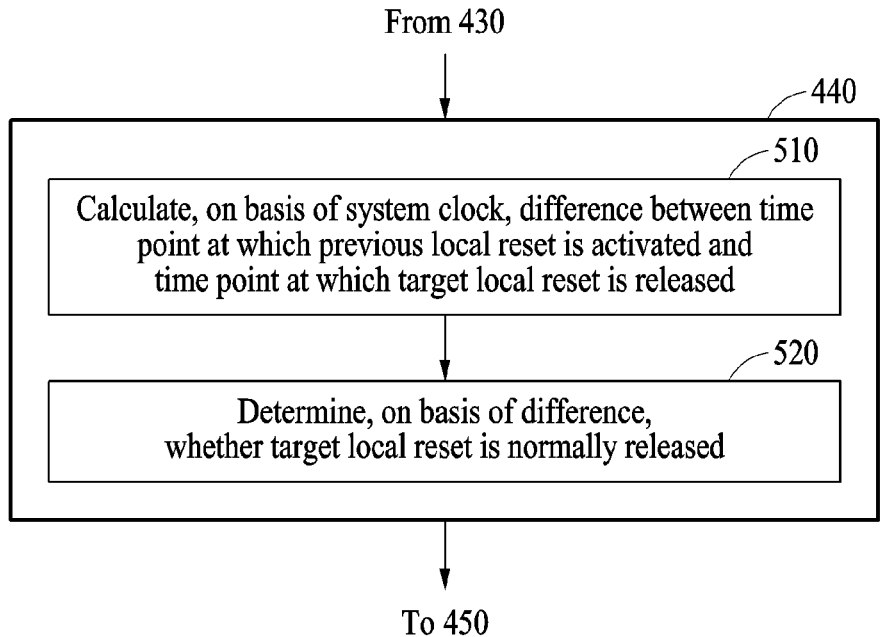

From 430

440

510
Calculate, on basis of system clock, difference between time point at which previous local reset is activated and time point at which target local reset is released 520
Determine, on basis of difference, whether target local reset is normally released To 450

FIG. 5

|  | Initial state | Local reset progress state | Local reset end state | Error state |
|---|---|---|---|---|
| First checker | High | Low | High | Low |
| Second checker | High | Low | Low | High |

FIG. 6

METHOD FOR DETERMINING FUNCTIONAL SAFETY OF RESET, AND ELECTRONIC DEVICE FOR EXECUTING SAME

CROSS REFERENCE TO RELATED APPLICATION

This application is a U.S. national stage filing under 35 U.S.C § 371 of PCT Application No. PCT/KR2020/009507 filed on Jul. 20, 2020, and entitled "METHOD FOR DETERMINING FUNCTIONAL SAFETY OF RESET, AND ELECTRONIC DEVICE FOR EXECUTING SAME" which is based on and claims priority to Korean Patent Application No. 10-2019-0150127, filed on Nov. 21, 2019, which applications are each hereby incorporated herein by reference in their entireties.

TECHNICAL FIELD

The following description relates to a technology for determining functional safety of a reset, and more particularly, to a technology for determining functional safety of a reset by monitoring a release sequence of the reset.

BACKGROUND ART

With the development of technologies for an advanced driver assistance system (ADAS) or an autonomous vehicle, a function for ISO 26262 has been emphasized. ISO 26262 is an international standard for automotive functional safety to implement functional safety. ISO 26262 defines an activity required together with a process model, a tangible and intangible evidence, and a method used for development and production.

DISCLOSURE OF THE INVENTION

Technical Goals

An aspect provides a method for determining functional safety of a reset, and an electronic device thereof.

Another aspect provides a method for determining functional safety of a reset by monitoring a release sequence of the reset, and an electronic device thereof.

Technical Solutions

According to an aspect, there is provided a method for monitoring a reset release sequence of a system performed by an electronic device, the method including receiving a reset root from an external device, toggling states of a first checker and a second checker to preset states when the reset root is received, determining, on the basis of a clock of the system, whether the local reset is normally released when a release of at least one local reset is received, toggling the state of the second checker when the at least one local reset is not normally released, toggling the state of the first checker when a final local reset of the at least one local reset is normally released, and outputting the state of the first checker and the state of the second checker. A release state of the local reset is monitored on the basis of the state of the first checker and the state of the second checker.

The toggling of the states of the first checker and the second checker to the preset states when the reset root is received may include toggling the state of the first checker to a low state, and toggling the state of the second checker to a low state.

The toggling of the state of the first checker when the final local reset is normally released may include toggling the state of the first checker to a high state.

The determining of whether the local reset is normally released may include calculating, on the basis of the clock of the system, a difference between a time point at which a previous local reset is released and a time point at which a target local reset is released, and determining, on the basis of the difference, whether the target local reset is normally released.

The determining of whether the local reset is normally released may include determining whether an order in which a target local reset is released is normal.

The method may further include monitoring the release state of the local reset on the basis of the state of the first checker and the state of the second checker. The monitoring may include determining whether the state of the first checker and the state of the second checker are maintained as the preset states, and outputting a reset error when at least one of the state of the first checker and the state of the second checker is not a preset state.

The electronic device may be included in an autonomous vehicle or a vehicle that supports an advanced driver assistance system (ADAS).

According to another aspect, there is provided an electronic device for monitoring a reset release sequence of a system, the electronic device including a memory in which a program for monitoring a reset release sequence is recorded, and a processor configured to perform the program. The program is configured to perform an operation of receiving a reset root from an external device, an operation of toggling states of a first checker and a second checker to preset states when the reset root is received, an operation of determining, on the basis of a clock of the system, whether the local reset is normally released when a release of at least one local reset is received, an operation of toggling the state of the second checker when the at least one local reset is not normally released, an operation of toggling the state of the first checker when a final local reset of the at least one local reset is normally released, and an operation of outputting the state of the first checker and the state of the second checker. A release state of the local reset is monitored on the basis of the state of the first checker and the state of the second checker.

The operation of toggling the states of the first checker and the second checker to the preset states when the reset root is received may include an operation of toggling the state of the first checker to a low state, and toggling the state of the second checker to a low state.

The operation of toggling the state of the first checker when the final local reset is normally released may include an operation of toggling the state of the first checker to a high state.

The operation of determining whether the local reset is normally released may include an operation of calculating, on the basis of the clock of the system, a difference between a time point at which a previous local reset is released and a time point at which a target local reset is released, and an operation of determining, on the basis of the difference, whether the target local reset is normally released.

The operation of determining whether the local reset is normally released may include an operation of determining whether an order in which a target local reset is released is normal.

The program may be further configured to perform an operation of monitoring the release state of the local reset on the basis of the state of the first checker and the state of the second checker. The operation of monitoring may include an operation of determining whether the state of the first checker and the state of the second checker are maintained as the preset states, and an operation of outputting a reset error when at least one of the state of the first checker and the state of the second checker is not a preset state.

The electronic device may be included in an autonomous vehicle or a vehicle that supports an ADAS.

Advantageous Effects

A method for determining functional safety of a reset, and an electronic device thereof may be provided.

A method for determining functional safety of a reset by monitoring a release sequence of the reset, and an electronic device thereof may be provided.

BRIEF DESCRIPTION OF DRAWINGS

FIG. 5 is a flowchart of a method for determining, on the basis of a clock, whether a local reset is normally released according to an example.

FIG. 6 illustrates a table for determining a state of a local reset and presence or absence of an error according to output states of a first checker and a second checker according to an example.

BEST MODE FOR CARRYING OUT THE INVENTION

Figure 1:
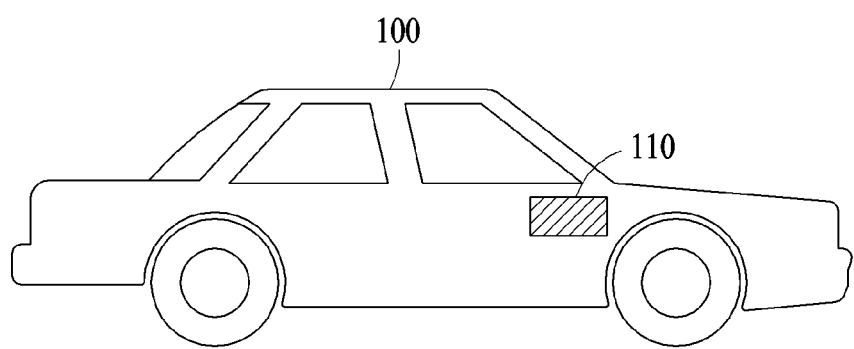
FIG. 1 illustrates a vehicle mounted with an electronic device according to an example.

Hereinafter, example embodiments are described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

FIG. 1 illustrates a vehicle mounted with an electronic device according to an example.

According to an aspect, a vehicle 100 may travel in an autonomous mode according to a recognized driving environment even in a situation in which there is little or no input from a driver. The driving environment may be recognized through one or more sensors attached to or installed in the vehicle 100. For example, the one or more sensors may include a camera, a LIDAR, a RADAR, and voice recognition sensors, but are not limited to the described examples. The driving environment may include a road, a state of the road, a type of lane, presence or absence of a surrounding vehicle, a distance to a nearby vehicle, weather, presence or absence of an obstacle, and the like, and is not limited to the described examples.

The vehicle 100 recognizes the driving environment, and generates an autonomous travel route suitable for the driving environment. In order to follow the autonomous travel route, an autonomous vehicle controls internal and external mechanical elements. The vehicle 100 may periodically generate the autonomous travel route.

According to another aspect, the vehicle 100 may assist a driver in driving using an advanced driver assistance system (ADAS). The ADAS includes an autonomous emergency braking (AEB) system that autonomously reduces speed or stops in the event of a risk of collision even when a driver does not step on a brake, a lane keep assist system (LKAS) that maintains a lane by adjusting a direction of travel in the event of a lane departure, an advanced smart cruise control (ASCC) that maintains a distance from a vehicle in front while travelling at a preset speed, an active blind spot detection (ABSD) system that helps to change a lane safely by detecting a risk of collision in a blind spot, and an around view monitor (AVM) system that visually shows the surroundings of a vehicle.

The electronic device 110 included in the vehicle 100 may control a mechanical device of the vehicle 100 to autonomously travel or assist a driver in driving, and may be used for an ECU and various types of controllers or sensors in addition to the described example embodiment. The electronic device 110 automatically controls a mechanical element, and thus accuracy of control is highly important. For example, when a reset of control is performed at a timing different from that intended by the electronic device 110 due to a reset function error, an accident may occur. For example, when control for reducing speed is performed at a late timing rather than an accurate timing, an accident may occur.

Accordingly, before the mechanical element is controlled, a method for determining whether a reset function is normal needs to be performed. The above description is related to ISO 26262 or an international standard for automotive functional safety. ISO 26262 is an international standard for automotive functional safety established by ISO so as to prevent an accident caused by an error in an electric & electronic (E/E) system mounted on the vehicle 100. ISO 26262 defines an activity required together with a process model, a tangible and intangible evidence, and a method used for development and production.

A method for determining functional safety of a reset is described in detail below with reference to FIGS. 2 to 10.

Figure 2:
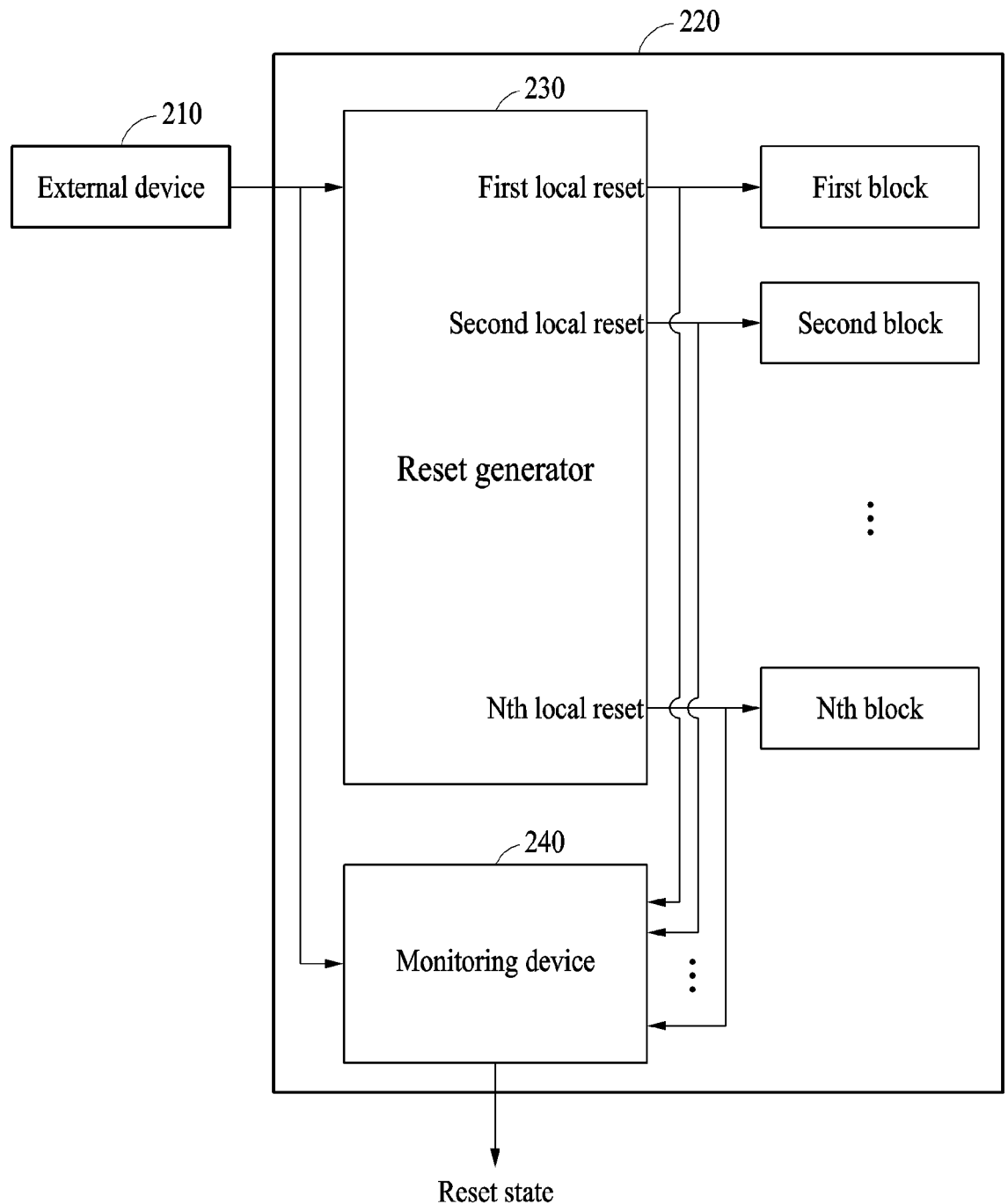
FIG. 2 is a configuration diagram of a reset system according to an example.

FIG. 2 is a configuration diagram of a reset system according to an example.

A reset generally starts from an initialization state of a low state, and functions normally as the state of the reset is toggled (reset release) to a high state. There is a case in which several types of resets are used depending on a system. In this case, a timing sequence in which each of a plurality of resets is released is predetermined. Each of the plurality of resets may be referred to as a local reset. For example, a timing at which and a sequence in which a plurality of local resets are performed may be predetermined. When a timing sequence in which the plurality of local resets are released does not follow a predetermined sequence, a problem may occur in the system.

In order to prevent such a problem, a monitoring device 240 that monitors local resets generated by a reset generator 230 may be considered.

A system 220 may include the reset generator 230 and the monitoring device 240. The system 220 may receive a reset root from an external device 210, generate local resets through the reset generator 230, and monitor, through the monitoring device 240, a timing sequence in which a plurality of local resets are released. When a sequence in which or a timing at which a local reset is outputted is incorrect, an error may be outputted. Hereinafter, a method for monitoring a reset release sequence is described in detail below with reference to FIGS. 3 to 10.

Figure 3:
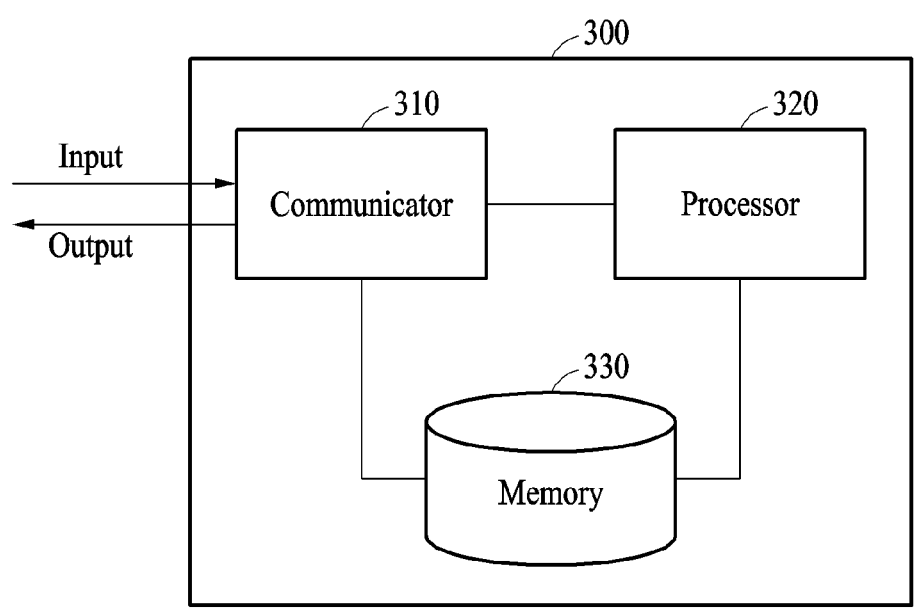
FIG. 3 is a configuration diagram of an electronic device for monitoring a reset release sequence according to an example embodiment.

FIG. 3 is a configuration diagram of an electronic device for monitoring a reset release sequence according to an example embodiment.

An electronic device 300 includes a communicator 310, a processor 320, and a memory 330. For example, the electronic device 300 may correspond to the electronic device 110 described above with reference to FIG. 1 or may correspond to the monitoring device 240 described above with reference to FIG. 2.

The communicator 310 is connected to the processor 320 and the memory 330 to transmit and receive data. The communicator 310 may be connected to another external device to transmit and receive data. Hereinafter, transmitting and receiving "A" may indicate transmitting and receiving information or data indicating "A."

The communicator 310 may be implemented as a circuitry in the electronic device 300. For example, the communicator 310 may include an internal bus and an external bus. For another example, the communicator 310 may be an element that connects the electronic device 300 and an external device to each other. The communicator 310 may be an interface. The communicator 310 may receive data from the external device, and transmit the data to the processor 320 and the memory 330.

The processor 320 processes data received by the communicator 310 and data stored in the memory 330. A "processor" may be a hardware-implemented data processing device having a circuit with a physical structure for executing desired operations. For example, the desired operations may include a code or instructions included in a program. For example, the hardware-implemented data processing device may include a microprocessor, a central processing unit, a processor core, a multi-core processor, a multiprocessor, an application-specific integrated circuit (ASIC), and a field programmable gate array (FPGA).

The processor 320 executes a computer-readable code (for example, software) stored in a memory (for example, the memory 330) and instructions induced by processor 320.

The memory 330 stores data received by the communicator 310 and data processed by the processor 320. For example, the memory 330 may store a program (or an application, software). The stored program may be a set of syntaxes that are coded to monitor a reset release sequence, and are executable by the processor 320.

According to an aspect, the memory 330 may include one or more of volatile memories, a non-volatile memory and a random access memory (RAM), a flash memory, a hard disk drive, and an optical disk drive.

The memory 330 stores an instruction set (for example, software) for operating the electronic device 300. The instruction set for operating the electronic device 300 is executed by the processor 320.

The communicator 310, the processor 320, and the memory 330 are described in detail below with reference to FIGS. 4 to 10.

Figure 4:
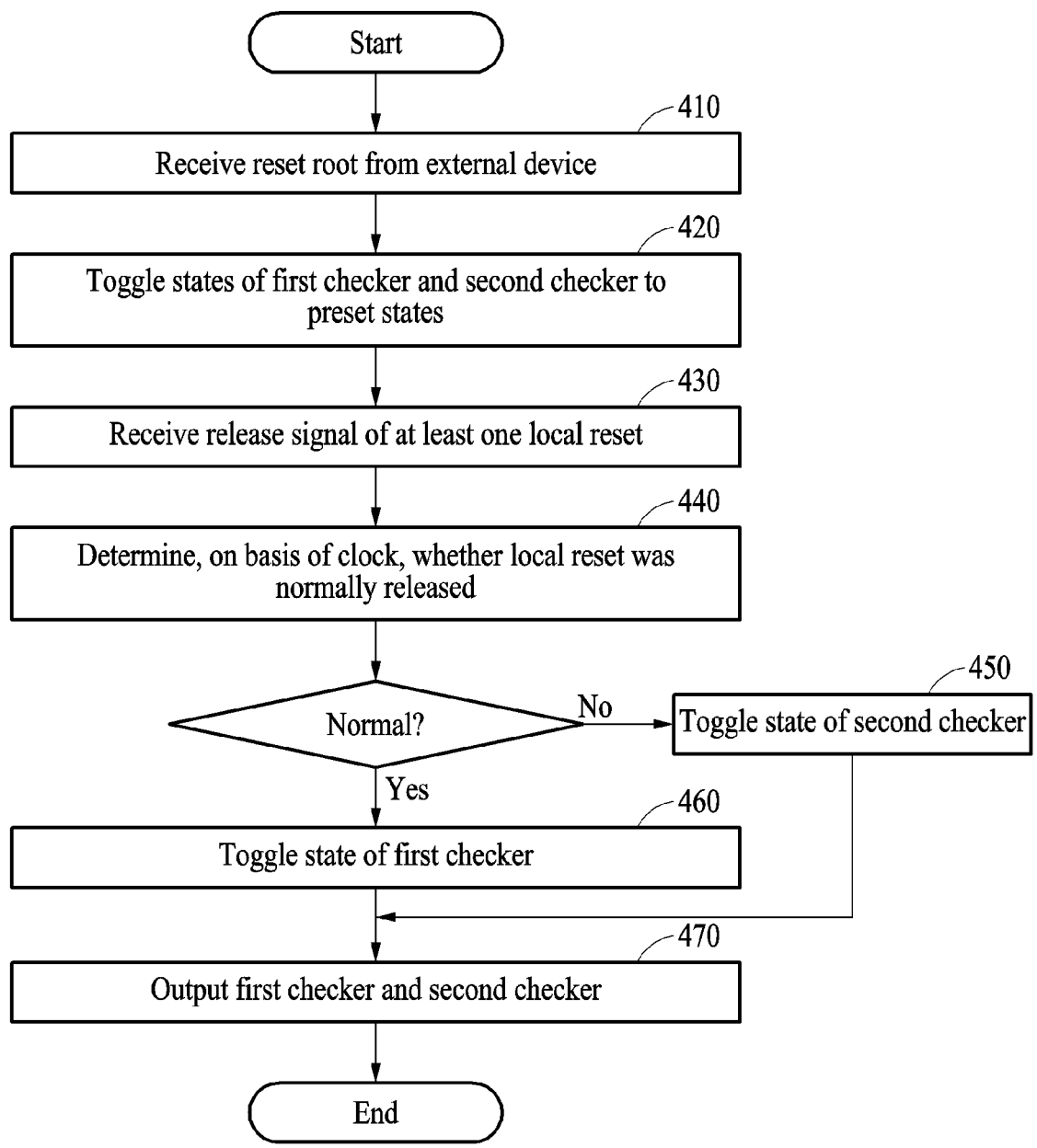
FIG. 4 is a flowchart of a method for monitoring a reset release sequence according to an example embodiment.

FIG. 4 is a flowchart of a method for monitoring a reset release sequence according to an example embodiment.

The following operations 410 to 470 are performed by the electronic device 300 described above with reference to FIG. 3.

In operation 410, the electronic device 300 receives a reset root from an external device. For example, the reset root may be generated by an external power supply or an external reset generation block. The reset root may be received before a time point 701 referring to FIG. 7, or before a time point 801 referring to FIG. 8.

Referring back to FIG. 4, in operation 420, when the reset root is received, the electronic device 300 toggles states of a first checker and a second checker to preset states. The first checker and the second checker may have two states. For example, the states may be a low state or a high state. For another example, the states may be bit 0 or bit 1. A state preset for the first checker may be the low state, and a state preset for the second checker may be the low state.

Figure 8:
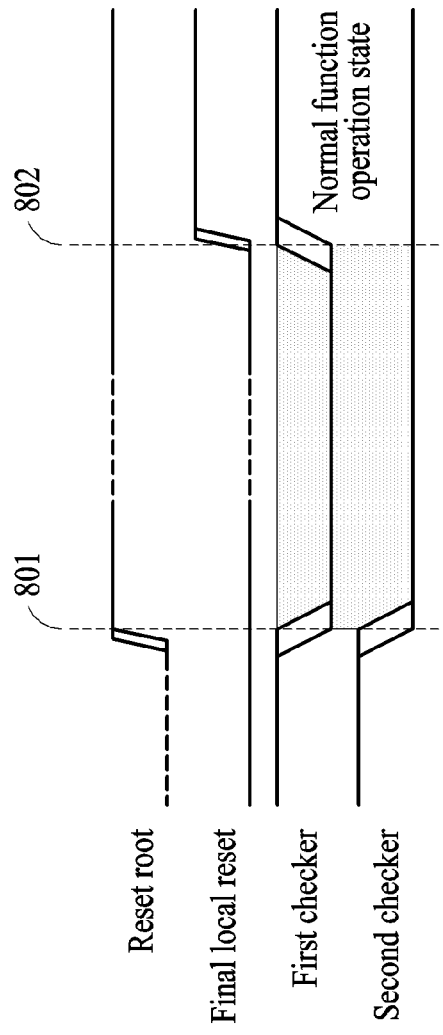
FIG. 8 illustrates a timing chart of a reset root, a final local reset, a first checker, and a second checker according to an example.

For example, referring to FIG. 8, at the time point 801, the state of the first checker is toggled from the high state to the low state, and the state of the second checker is toggled from the high state to the low state.

Referring back to FIG. 4, in operation 430, the electronic device 300 receives at least one local reset release signal. For example, a release signal of a target local reset may be received from the reset generator 220 described above with reference to FIG. 2. The released target local reset may be one of a first local reset to an Nth local reset. The reset generator 220 may generate, on the basis of the reset root, a signal for releasing the target local reset at a preset timing and in a preset sequence.

Figure 7:
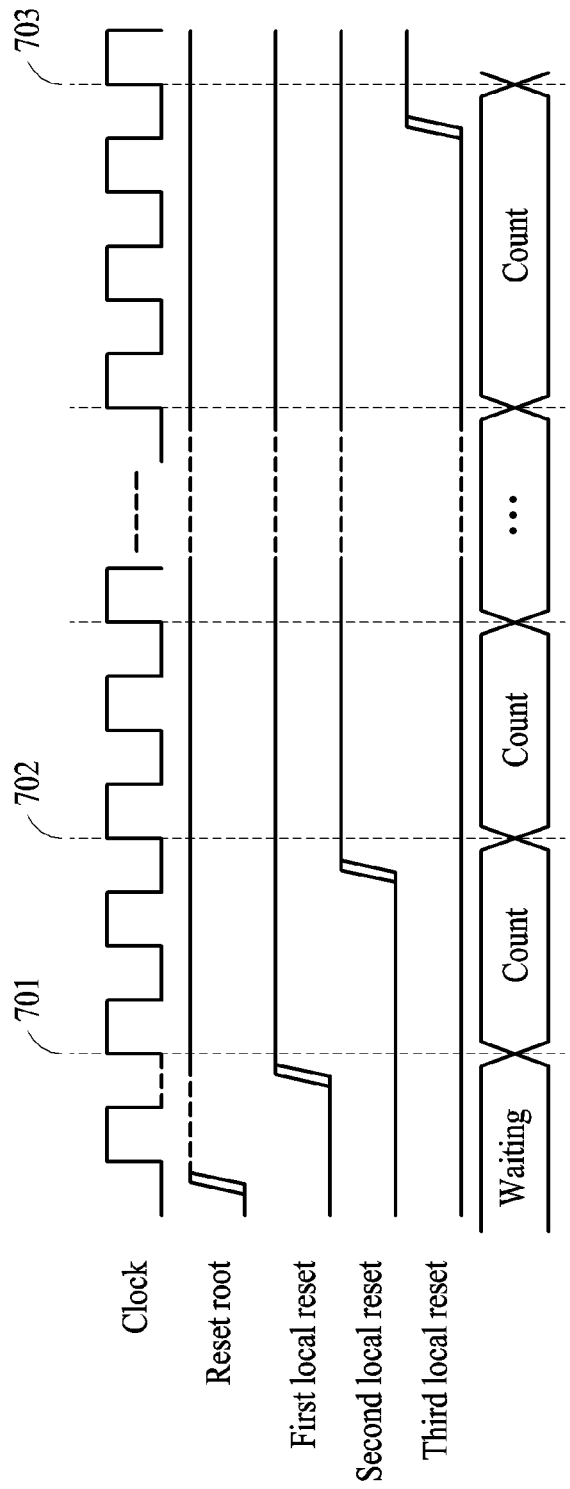
FIG. 7 illustrates a timing chart of a clock, a reset root, and local resets according to an example.

A release signal of the first local reset may be received at the time point 701 referring to FIG. 7, a release signal of the second local reset may be received at a time point 702, and a release signal of the Nth local reset may be received at a time point 703. The release signal of the Nth local reset is a final local reset signal.

Referring back to FIG. 4, in operation 440, when a release of a target local reset of at least one local reset is received, the electronic device 300 may determine, on the basis of a system clock, whether the target local reset is normally released. For example, it may be determined whether the target local reset is released at a preset timing. For another example, it may be determined whether an order in which the target local reset is released is normal.

Referring to FIG. 5, operation 440 may include the following operations 510 and 520.

In operation 510, the electronic device 300 calculates, on the basis of a system clock, a difference between a time point at which a previous local reset is activated and a time point at which a target local reset is released. For example, referring to FIG. 7, a difference between the time point 701 at which a first local reset is activated and the time point 702 at which a second local reset is activated may be calculated on the basis of the system clock.

In operation 520, the electronic device 300 determines, on the basis of the calculated difference, whether a target local reset is normally released.

Referring back to FIG. 4, in operation 450, the electronic device 300 toggles the state of the second checker when the target local reset is not normally released. For example, the state of the second checker may be toggled from the low state to the high state. The state of the first checker is not toggled.

When the target local reset is not a final local reset, operations 430 and 440 may be re-performed. After operation 440 is performed, the state of the first checker and the state of the second checker may be outputted. For example, when the target local reset operates normally, the outputted state of the first checker may be the low state, and the outputted state of the second checker may be the low state.

In operation 460, the electronic device 300 toggles the state of the first checker when the final local reset is normally released. For example, when the state of the first checker is the low state, the state of the first checker is toggled to the high state. The state of the second checker is not toggled.

Referring to FIG. 8, the first checker is toggled to the high state at a time point 802 at which the final local reset is released.

Referring back to FIG. 4, in operation 470, the electronic device 300 outputs the states of the first checker and the second checker. For example, the states of the first checker and the second checker may be outputted to an external device of the electronic device 300. The external device may monitor a release state of a local reset on the basis of the states of the first checker and the second checker. For another example, the electronic device 300 may monitor the release state of the local reset on the basis of the outputted states of the first checker and the second checker. The state of the first checker and the state of the second checker may be monitored during a period when the local reset is released and activated, thereby monitoring functional safety of a reset.

Referring to FIG. 6, a reset state may be determined on the basis of the state of the first checker and the state of the second checker. For example, the reset state corresponding to the state of the first checker and the state of the second checker may be determined as one of an initial state, a local reset progress state, a local reset end state, and an error state.

Here, a reason for outputting both checkers instead of outputting presence or absence of an error using one signal is to allow the external device to recognize occurrence of a reset abnormal state even when an outputted signal is stuck or floated.

Referring to FIG. 8, it is possible to monitor the state of the first checker and the state of the second checker maintained as the low state after the time point 801 at which the reset root is received, and the state of the first checker maintained as the high state and the state of the second checker maintained as the low state after the time point 802 at which the final local reset is received.

The electronic device 300 or the external device that receives the state of the first checker and the state of the second checker outputs a reset error when at least one of the state of the first checker and the state of the second checker is not a preset state. When the local reset is unintentionally activated or deactivated, the at least one of the state of the first checker and the state of the second checker may change. When the at least one of the state of the first checker and the state of the second checker is not the preset state (for example, when the state of the first checker is the low state, and the state of the second checker is the high state), the reset may be determined to operate abnormally.

Figure 9:
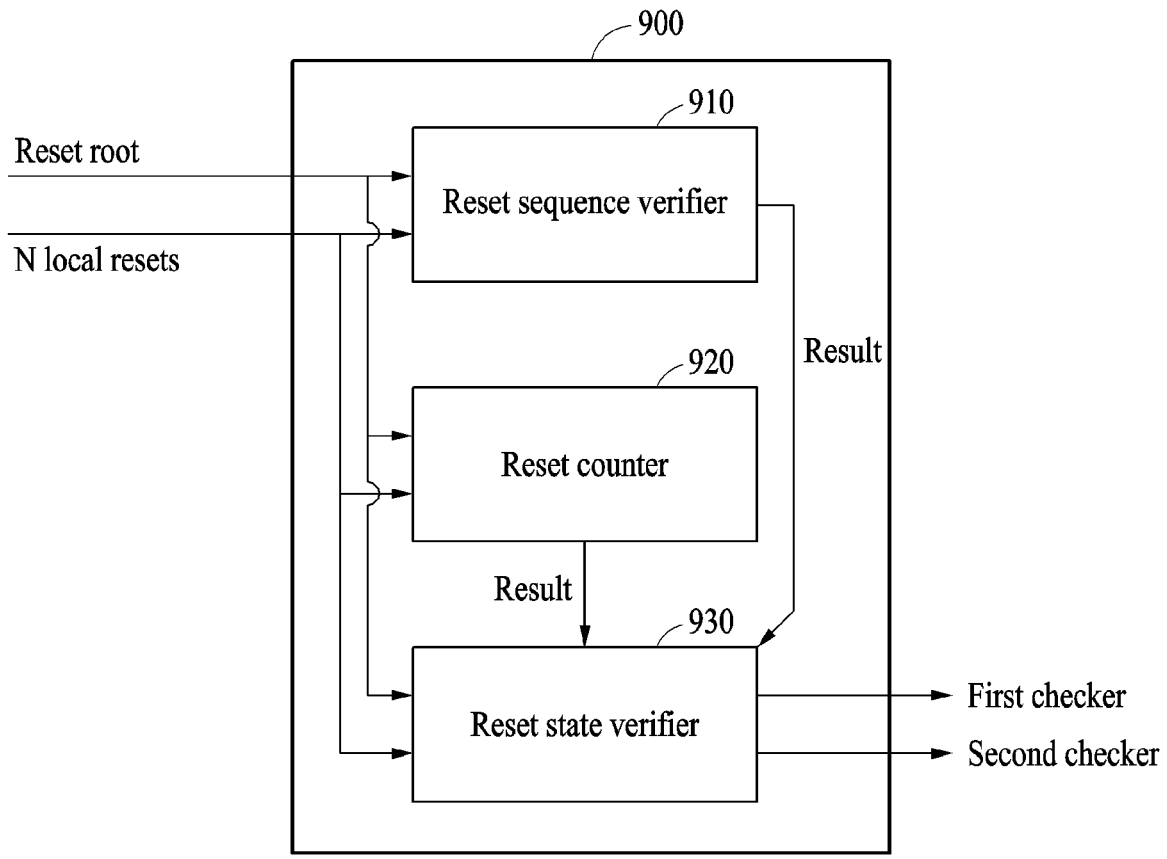
FIG. 9 is a configuration diagram of modules of an electronic device according to an example.

FIG. 9 is a configuration diagram of modules of an electronic device according to an example.

According to an aspect, an electronic device 900 may include a reset sequence verifier 910, a reset counter 920, and a reset state verifier 930. The electronic device 900 may be the electronic device 300 described above with reference to FIGS. 3 to 8. The reset sequence verifier 910, the reset counter 920, and the reset state verifier 930 may be implemented using resources of a communicator, a processor, and a memory of the electronic device 900.

The reset sequence verifier 910 verifies a reset sequence on the basis of a reset root and a release of a local reset. For example, it may be determined whether an order in which a target local reset is released corresponds to a preset order. When the order in which the target local reset is released does not correspond to the preset order, presence of a reset error may be outputted as a result, and transmitted to the reset state verifier 930.

The reset counter 920 calculates a reset counter of the target local reset on the basis of the reset root and the release of the local reset. For example, the number of clock differences between a time point at which a previous local reset is released and a time point at which a target local reset is released may be calculated. When the calculated clock differences do not correspond to a preset clock difference, presence of a reset error may be outputted as a result, and transmitted to the reset state verifier 930.

The reset state verifier 930 may toggle states of a first checker and a second checker on the basis of the reset root, the release of the local reset, the result of the reset sequence verifier 910, and the result of the reset counter 920, and may output the states of the first checker and the second checker.

Figure 10:
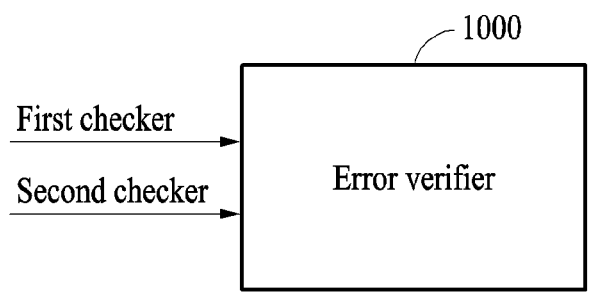
FIG. 10 is a configuration diagram of an error verifier module of an electronic device according to an example.

Referring to FIG. 10, the reset state verifier 930 may output the state of the first checker and the states of the second checker to an error verifier 1000, and the error verifier 1000 may determine a reset state on the basis of the state of the first checker and the state of the second checker. For example, the reset state may be determined on the basis of the table in FIG. 6.

According to an aspect, the error verifier 1000 may be a separate device or circuit not included in the electronic device 900.

According to another aspect, the error verifier 1000 may be a device or a circuit included in the electronic device 900.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), RAM, flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

Although the above example embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other example embodiments, and equivalents to the claims are also within the scope of the following claims.

The invention claimed is:

1. A method for monitoring a reset release sequence of a system performed by an electronic device, the method comprising:
receiving a reset root from an external device;
toggling states of a first checker and a second checker to preset states when the reset root is received;
determining, on the basis of a clock of the system, whether the local reset is normally released when a release of at least one local reset is received;
toggling the state of the second checker when the at least one local reset is not normally released;
toggling the state of the first checker when a final local reset of the at least one local reset is normally released; and
outputting the state of the first checker and the state of the second checker,
wherein a release state of the local reset is monitored on the basis of the state of the first checker and the state of the second checker.

2. The method of claim 1, wherein the toggling of the states of the first checker and the second checker to the preset states when the reset root is received comprises toggling the state of the first checker to a low state, and toggling the state of the second checker to a low state.

3. The method of claim 2, wherein the toggling of the state of the first checker when the final local reset is normally released comprises toggling the state of the first checker to a high state.

4. The method of claim 1, wherein the determining of whether the local reset is normally released comprises:
calculating, on the basis of the clock of the system, a difference between a time point at which a previous local reset is released and a time point at which a target local reset is released; and
determining, on the basis of the difference, whether the target local reset is normally released.

5. The method of claim 1, wherein the determining of whether the local reset is normally released comprises determining whether an order in which a target local reset is released is normal.

6. The method of claim 1, further comprising:
monitoring the release state of the local reset on the basis of the state of the first checker and the state of the second checker,
wherein the monitoring comprises:
determining whether the state of the first checker and the state of the second checker are maintained as the preset states; and
outputting a reset error when at least one of the state of the first checker and the state of the second checker is not a preset state.

7. The method of claim 1, wherein the electronic device is included in an autonomous vehicle or a vehicle that supports an advanced driver assistance system (ADAS).

8. A computer-readable recording medium recording a program to perform the method of claim 1.

9. An electronic device for monitoring a reset release sequence of a system, the electronic device comprising:
a memory in which a program for monitoring a reset release sequence is recorded; and
a processor configured to perform the program,
wherein the program is configured to perform:
an operation of receiving a reset root from an external device;
an operation of toggling states of a first checker and a second checker to preset states when the reset root is received;
an operation of determining, on the basis of a clock of the system, whether the local reset is normally released when a release of at least one local reset is received;
an operation of toggling the state of the second checker when the at least one local reset is not normally released;
an operation of toggling the state of the first checker when a final local reset of the at least one local reset is normally released; and an operation of outputting the state of the first checker and the state of the second checker, and a release state of the local reset is monitored on the basis of the state of the first checker and the state of the second checker.

10. The electronic device of claim 9, wherein the operation of toggling the states of the first checker and the second checker to the preset states when the reset root is received comprises an operation of toggling the state of the first checker to a low state, and toggling the state of the second checker to a low state.

11. The electronic device of claim 10, wherein the operation of toggling the state of the first checker when the final local reset is normally released comprises an operation of toggling the state of the first checker to a high state.

12. The electronic device of claim 9, wherein the operation of determining whether the local reset is normally released comprises:

an operation of calculating, on the basis of the clock of the system, a difference between a time point at which a previous local reset is released and a time point at which a target local reset is released; and an operation of determining, on the basis of the difference, whether the target local reset is normally released.

13. The electronic device of claim 9, wherein the operation of determining whether the local reset is normally released comprises an operation of determining whether an order in which a target local reset is released is normal.

14. The electronic device of claim 9, wherein the program is further configured to perform an operation of monitoring the release state of the local reset on the basis of the state of the first checker and the state of the second checker, wherein the operation of monitoring comprises:

an operation of determining whether the state of the first checker and the state of the second checker are maintained as the preset states; and an operation of outputting a reset error when at least one of the state of the first checker and the state of the second checker is not a preset state.

15. The electronic device of claim 9, wherein the electronic device is included in an autonomous vehicle or a vehicle that supports an ADAS.

* * * * *